United States Patent [19]
Halada

[11] 4,063,653
[45] Dec. 20, 1977

[54] AUTOMATIC HIGH SHELF STORE

[75] Inventor: Karl Rudolf Halada, Rupperswill, Switzerland

[73] Assignee: Oehler, Wyhlen, Lagertechnic AG, Aarau, Switzerland

[21] Appl. No.: 729,707

[22] Filed: Oct. 5, 1976

[51] Int. Cl.² ............................................... B65G 1/04
[52] U.S. Cl. ............................ 214/16.4 A; 214/730; 308/2 R
[58] Field of Search ............ 214/16.1 CC, 16.4 A, 214/730; 308/DIG. 7, DIG. 9, 3 R, 3.6, 5 R

[56] References Cited

U.S. PATENT DOCUMENTS

| | | | |
|---|---|---|---|
| 2,646,333 | 7/1953 | Abrahamson et al. | 308/3.6 |
| 2,951,053 | 8/1960 | Reuter et al. | 308/DIG. 9 |
| 3,043,452 | 7/1962 | Spillios | 214/16.4 A |
| 3,632,001 | 1/1972 | Richens et al. | 214/730 |

*Primary Examiner*—Lawrence J. Oresky

[57] ABSTRACT

An automatic high shelf storage apparatus especially adapted for storing and transporting heavy metal rods, pipes and sections which are placed into cassettes formed as a sled with runners which slide along longitudinal slideways within blocks of storage racks and which are adapted to be drawn out lifted and lowered as well as being thrust transversely by a draw out device, by lifting and elevation mechanisms, entrainment means and chain means. The extractor portion of the mechanism which extracts the cassette from the rack to push one of them into the slideway has limited rotational movement with respect to the elevator mechanism. The shape dimensions and construction of the cassette are such that the end cross bars of the cassette are grasped by an entrainment device from a conveying entrainment carriage so as to hook the cross bar from below and to move the cassette into the slideway from the rack or onto the rack from the slideway. The ends of the cassette numerous project a predetermined distance beyond the rack to facilitate extraction.

3 Claims, 18 Drawing Figures

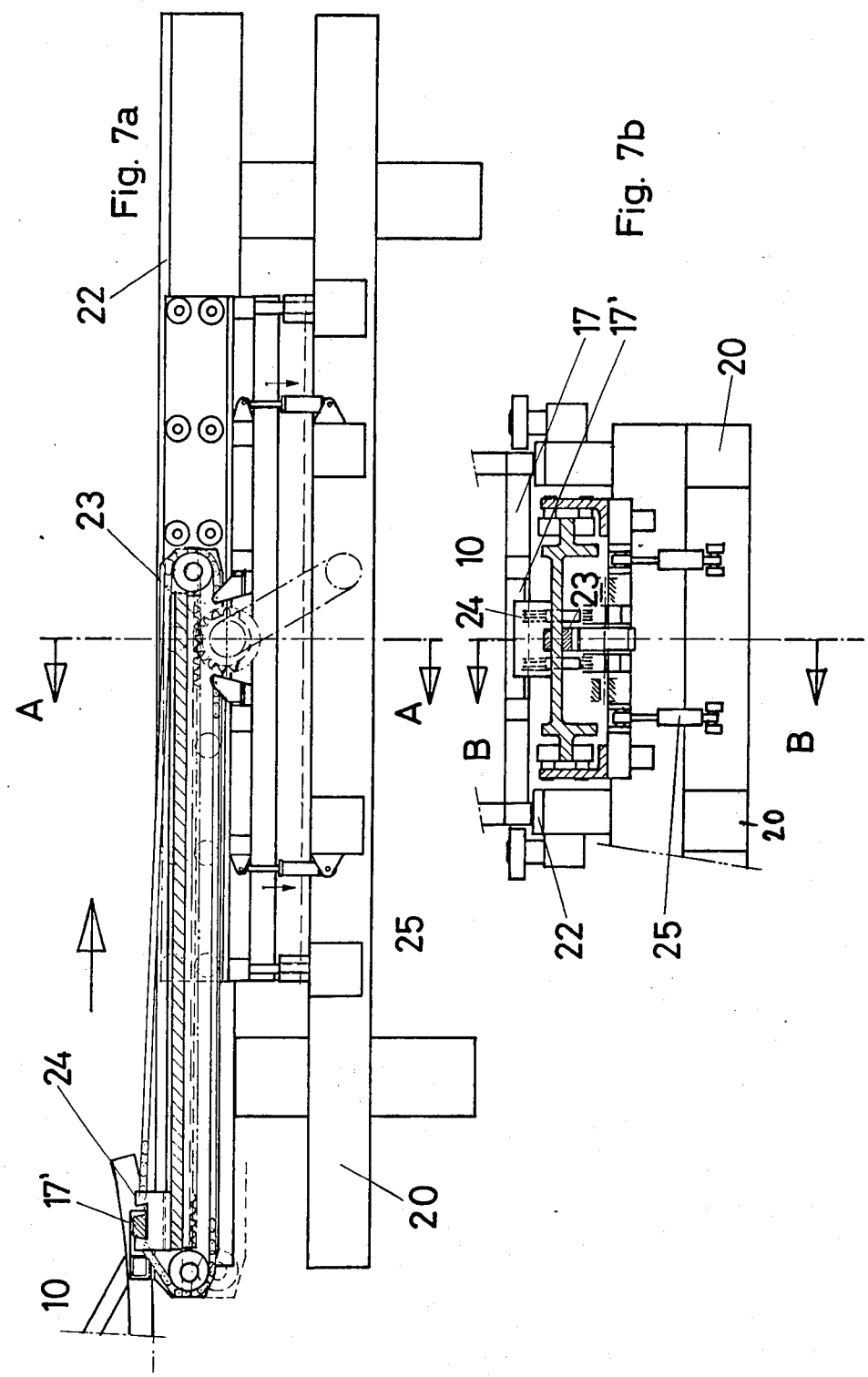

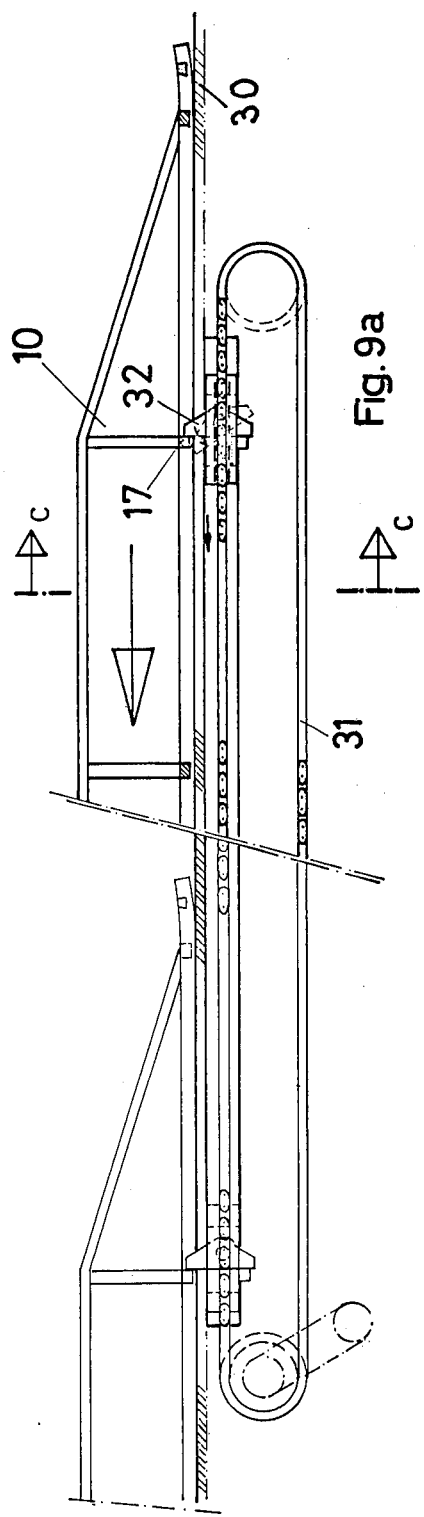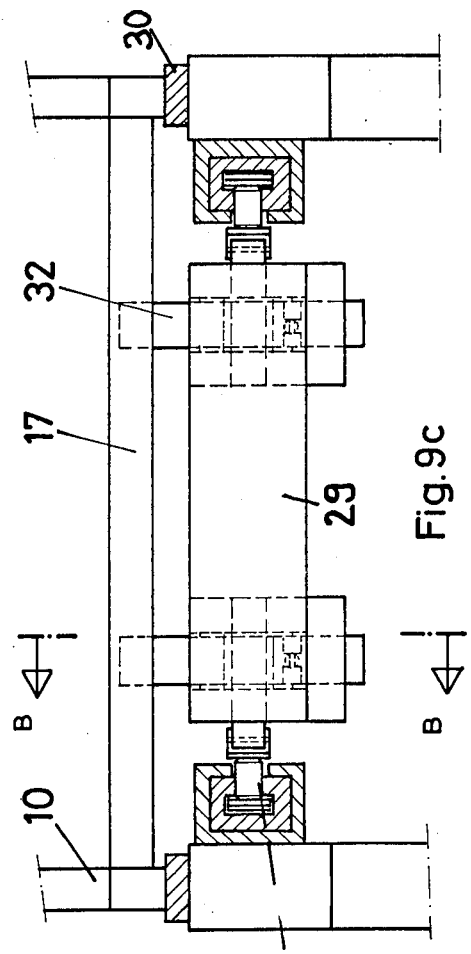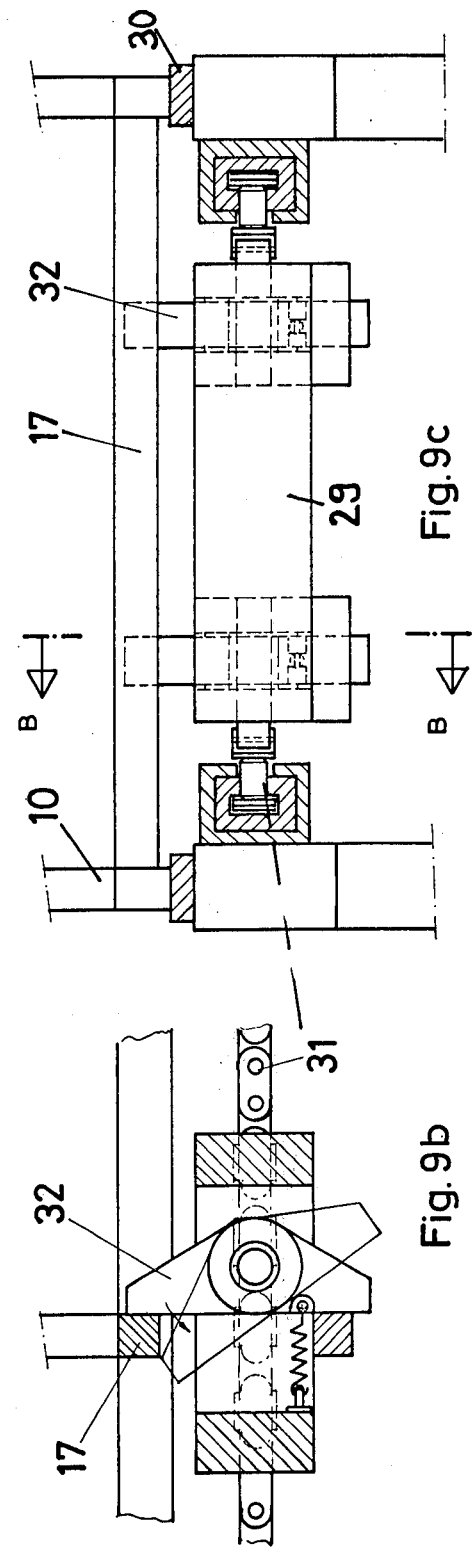

AUTOMATIC HIGH SHELF STORE

The present invention relates to an automatic high shelf store for long goods combined in cassette-like containers, having arranged between two storage rack blocks, a storage machine and pass-through points for the goods to be stored.

Long goods occur in numerous forms, e.g. as sections, rods or pipes in the metal trade, and pose special problems with regard to storage handling. For economical reasons, high rates of handling with regard to a given store size are desired, whereby, however, special problems arise upon the regulation of the work cycles in the event of peak loads. These difficulties become even greater upon the use of high shelf stores, in which the long goods are combined in sheetmetal troughs or grid cassettes and are inserted from the end face into the shelves. In the case of the full loading of the cassettes, often loads of 5,000 kg and more arise. Such long and heavy cassettes can no longer be positioned in a sufficiently accurate manner by means of the known draw-out devices having gripping arms or draw hooks, so that automatic operation can no longer be arranged in a trouble-free manner. It is further more often desired for two cassettes lying side-by-side to be put into store and taken out of store together. In this way the capacity of the storage machine is much increased. However, such a design stipulates that the two cassettes are guided precisely and are transported away from the automatic storage machine out of the high shelf store onto the commissioning places.

In accordance with the invention, an automatic high shelf store for goods combined in cassette-like containers is proposed, in which connection, between two storage rack blocks, a storage machine is arranged and pass-through points for the storage goods are present. The invention consists in that slide pieces fixed horizontally for the reception of the containers in the storage compartment and on the transfer mechanisms and having such liding properties that the static friction between the slide piece and the container for the goods in storage prevents an unintentional shifting of the container on its support. Advantageously the slides are accordingly impregnated with solid lubricant or treated with a slide lacquer.

The invention will be described further, by way of example, with reference to the accompanying drawings, in which.

Figure 5A:
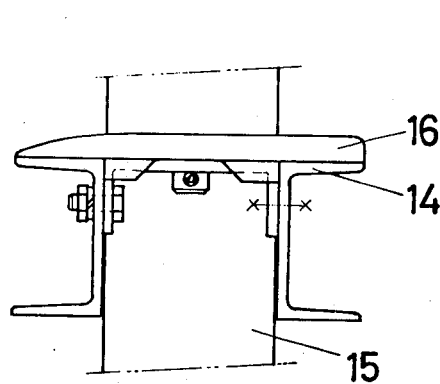
Figures 6A, 6B:
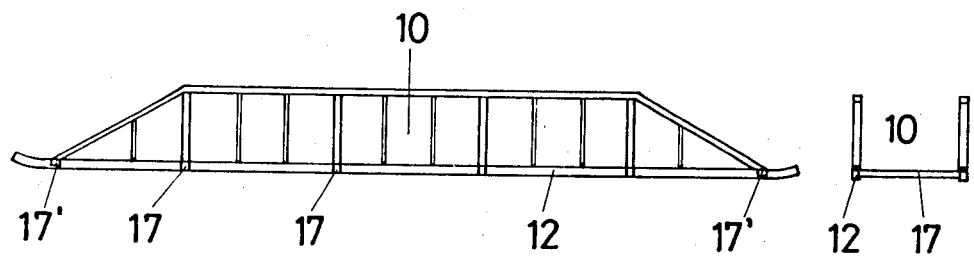
Figure 8B:
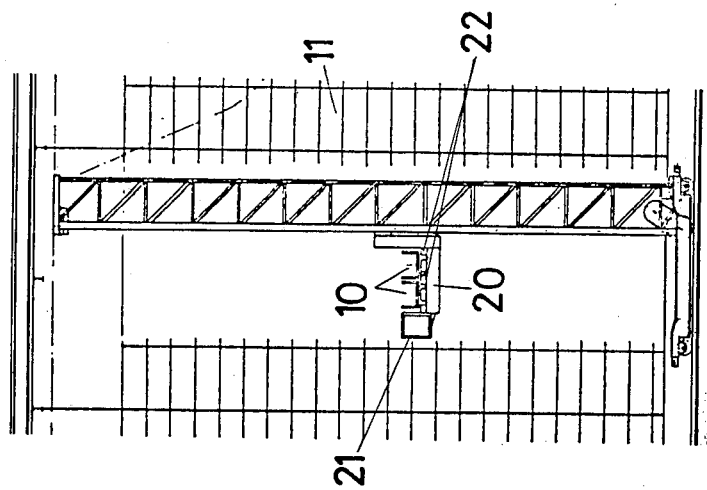
Figure 8A:
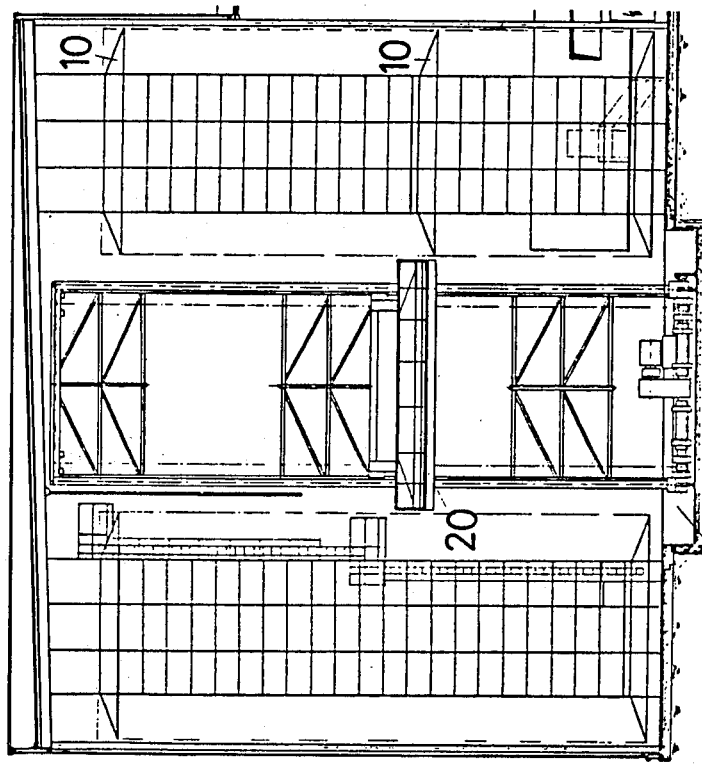

FIGS. 5a + 5b show details of the storage of cassettes in the shelf compartment;

FIGS. 6a + 6b show a schematically drawn cassette in side view and in front view;

FIGS. 7a + 7b show parts of a storage machine having an entrainment and draw-out device, in which connection FIG. 7a shows a section taken along the line B—B in FIG. 7b and FIG. 7b shows a cross-section taken along the line A—A in FIG. 7a;

FIGS. 8a + 8b show the storage machine in conjunction with the storage rack blocks;

FIGS. 9a, 9b, 9c show an entrainment and thrust device; and

Figure 10A:
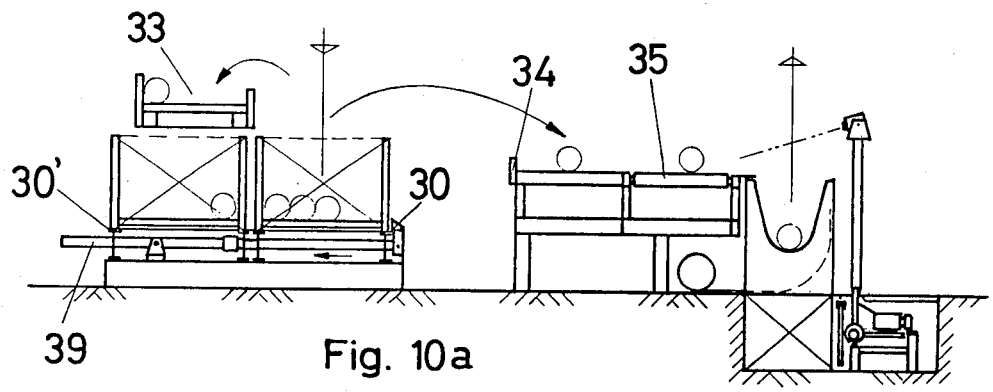
Figure 10B:
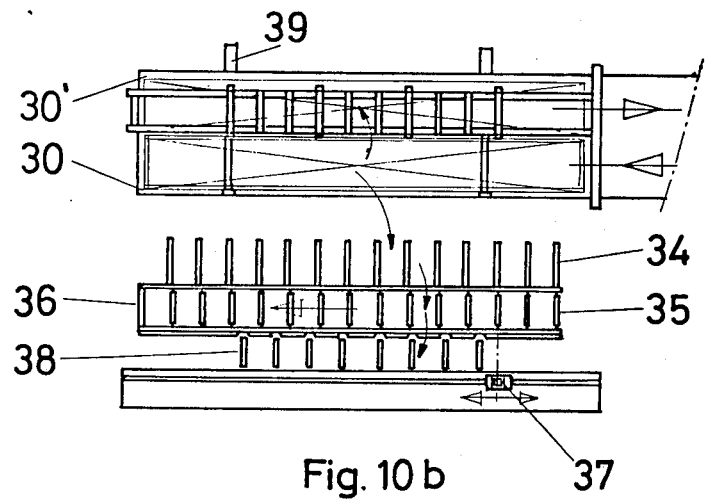
Figure 10:
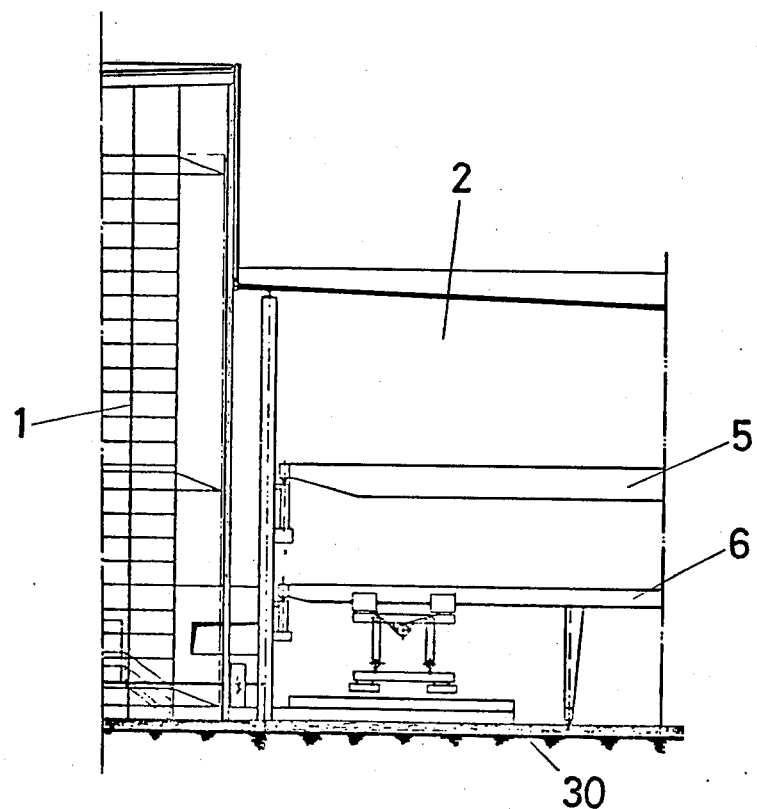

FIGS. 10a, 10b, 10c show the handling of long goods on the commissioning place.

The high shelf store has a building 13, in which two storage blocks 1 are accommodated. Laterally adjacent thereto is a large shed 2, which is surrounded by a commissioning place 3. The storage blocks are erected on load-bearing ground and are separated from one another by a gangway 9, which is offset downwards and serves for the reception of the rails of a storage machine 7. This moves on the rails 18 and has an elevator mechanism, by means of which the storage compartments 11 of the storage blocks can be served individually. The building 13 can, for example, be 55 m long, 24 m wide and about 21.6 m high in design, the storage blocks being designed as a steel construction. Each block has three rack support rows, so that side-by-side storage compartments arise which are arranged one above the other. In the longitudinal direction the racks are stabilised by vertical walls at both ends. The stabilisation and wind forces in the transverse direction are absorbed by trusses of each rack support row.

The two rack blocks are connected in the transverse direction by roof trusses. The wind forces, stabilisation forces and buffer forces in the longitudinal direction are introduced via respectively a roof truss at each and of the the large shed and wall trusses in the facades into the foundations. Four of the storage compartments 11 formed are designed as through-type compartments and have special slideways 30, as will be described later on.

The goods to be stored are combined and stored in cassettelike containers. Such a cassette 10 is shown schematically in FIGS. 6a and 6b. The cassette is welded in lattice type of construction from steel sections and has two lower long runners 12 and connecting crossbars 17 and 17'. The long runners are designed as protruding and smooth sledge runners, the runner ends being bent slightly upwards. They act in this respect as sledge horns upon the sliding onto the specially arranged storage surfaces in the storage compartments or on the transportation mechanisms.

Figure 1:
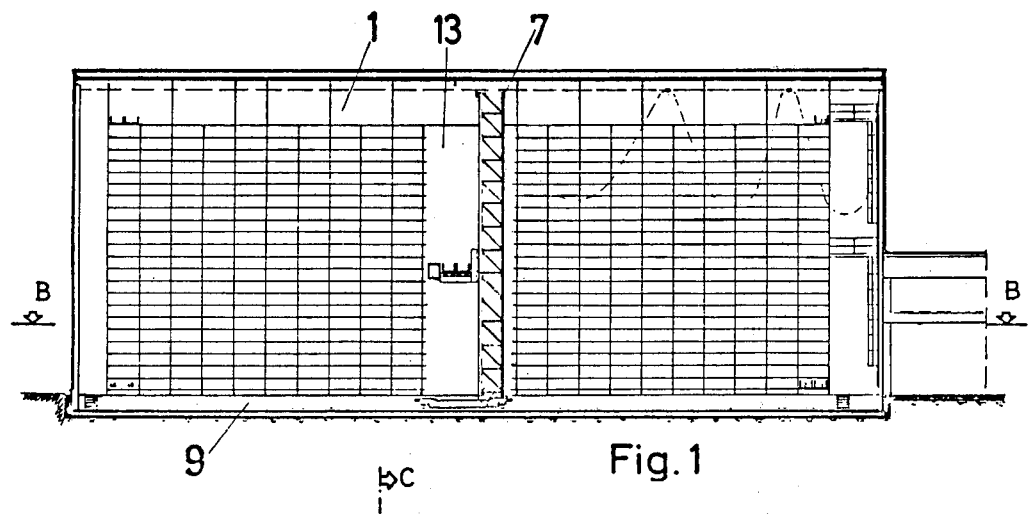
FIG. 1 shows a high shelf store for long goods in vertical longitudinal section, taken along the line A—A in FIG. 2.
Figure 2:
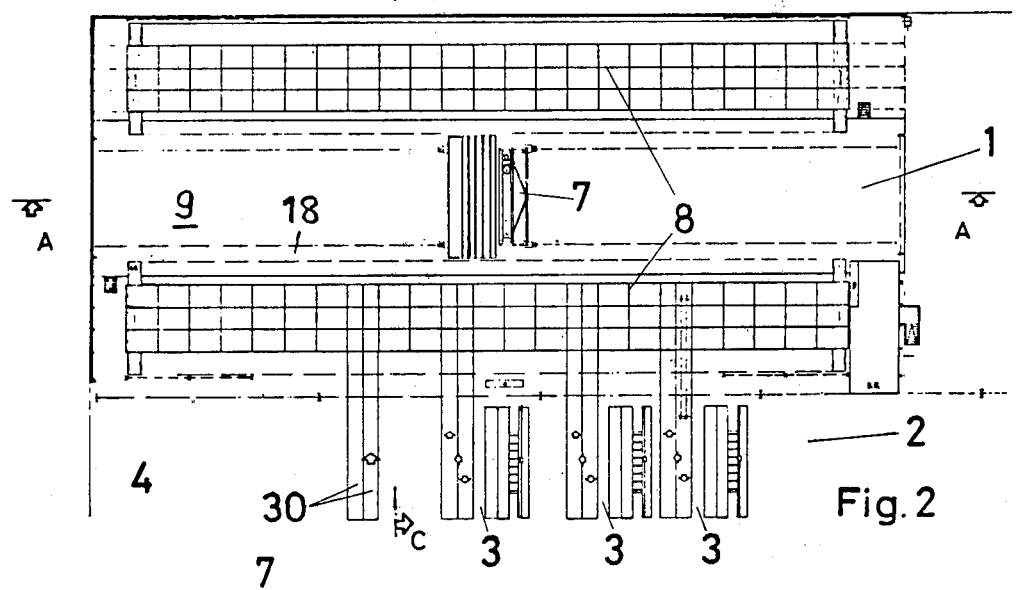
FIG. 2 shows a horizontal section taken along the line B—B in FIG. 1.
Figure 3:
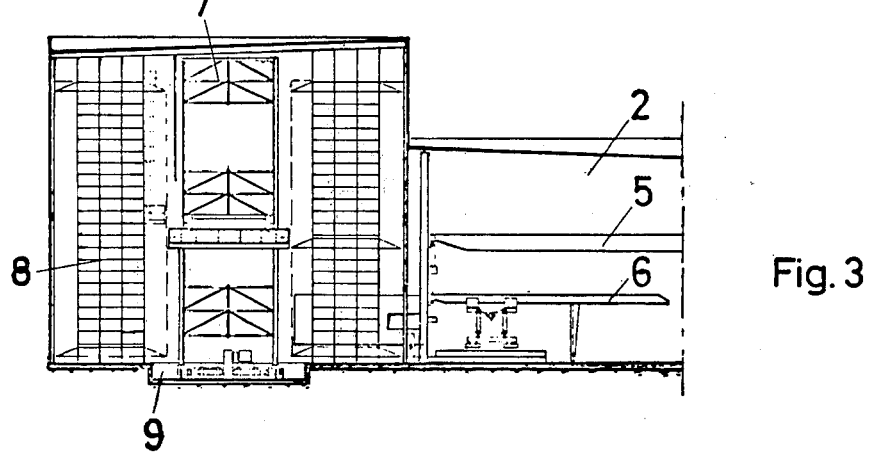
FIG. 3 shows a vertical cross-section taken along the line C—C in FIG. 2.
Figure 4:
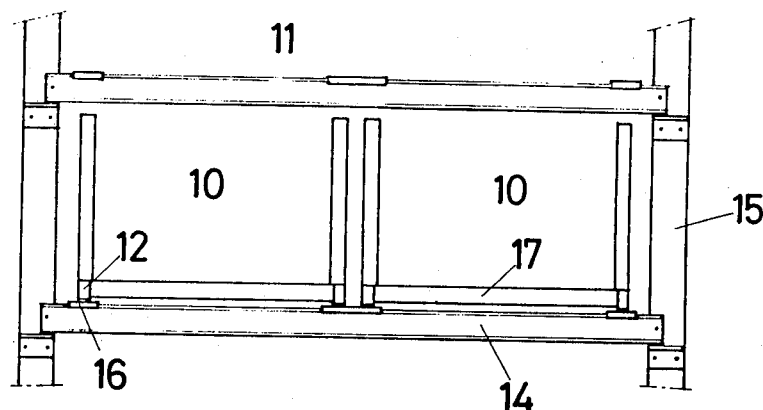
FIG. 4 shows a schematically drawn front view of a storage place on an enlarged scale.
Figure 5B:
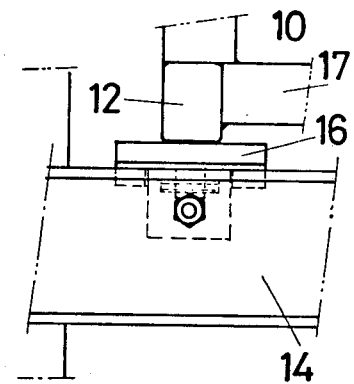

The design of a storage compartment 11 is shown in FIGS. 4, 5a and 5b. From the front view in FIG. 4 it is evident that the storage compartment has horizontal transoms 14, which are arranged between three rows of rack supports 15. The said transoms 14 carry slide pieces 16 in the region of the longerons 12. From FIGS. 5a and 5b there emerges the exemplified arrangement of fixing the slide pieces on the transom 14, which is bolted together from three U-sections. The slide pieces 16 themselves are, for example, produced from polyamide and filled with molybdenum disulphide. The long runners 12 are, if necessary, treated with a slide lacquer, it is advantageous if the slide pieces 16 are adapted to the shape of the transoms 14, which is necessary if the transoms are designed as a box or I-section.

It furthermore energes from FIG. 5a that the side pieces 16 are arranged absolutely horizontally, since an inclination, as would for example be necessary for roller bearings, is not necessary. The static friction between the slide piece and the container for the goods to be stored is so selected that an unintentional displacement of the cassette-like container is reliably prevented. The entire arrangement is such that the long material cassettes 10 rest on a length of about 4,5 m on altogether eight slide pieces 16 and project on both sides about 1,5m beyond the storage rack. The storage compartments 11 are so designed that two cassettes 10 are accomodated side-by-side in each storage compartment in each case. In accordance with the example discussed, about 2,100 cassettes can be stored in the installation, which corresponds to a total load of about 11,000 tonnes.

Present for the conveyance of the cassettes is the said storage machine 7, which is substantially known and not described in more detail. The storage machine 7 has the draw-out device, evident from FIGS. 7a and 7b, which has a lifting table 20, on which drawing tracks 22 are mounted along with interpolation of a lifting mechanism 25 and a draw rod 23. Furthermore, the lifting table is provided with a gangway 21. The lifting table 20 is somewhat larger than the largest cassette to be transported and is equipped with draw rods 23, which carry an entrainment device 24. The entrainment device 24 is made as an U-section piece and serves for grasping the outermost crossbar 17' of the cassette 10, which is grasped from below and entrained. For this purpose the lifting mechanism 25 is used, which raises the entrainment means 24 somewhat. The cassette 10 slides on its support and can be pushed by the storage machine 7 into the storage compartments 11 or be withdrawn from a storage compartment. It is easily possible to provide an automatic control for the storage machine. Such controls are described in Swiss Pat. Nos. 520.049; 520.612; 522.924; 535.688 and 536.790.

The arrangement of the cassettes 10 in the storage compartments and the arrangement of the storage machine 7 with drawout device is particularly well evident from FIGS. 8a and 8b.

Four of the storage compartments 11 are set up for the passthrough of cassettes and have two slideways 30 lying side-by-side which extend laterally into the large shed 2. The one slideway serves, in this respect, for the transportation of cassettes from the high shelf store 1 into the large shed 2 and the other undertakes the return transportation. In this connection, the cassettes 10 have to be transferred from the one way onto the other slideway. A transverse thrust installation, which is not shown in more detail, serves for this purpose.

The conveyance of the cassettes on the slideways 30 is effected by means of endless chains 31, between which an entrainment carriage 29 is fixed. This has two pawls 32, which grasps the cassettes, pushed onto the slideway from the storage machine 7 at one of the crossbars 17 and entrains same as far as the end of the slideway. Then the carriage 29 travels back into the initial position, during which the entrainment means disengage and the truck can run through unhindered under the cassette standing on the slideway and can return once more into its initial position.

At the removal place the material is grasped by a semiportal crane and deposited onto a table 34. Pipe parts, which are not yet required for the further processing, are deposited into a trough 33. Arranged on one side of the table 34 is a roller bed 35 having a stop 36, on which the pipes can be measured by means of a length measuring device 37. The commissioned pipes are then weighed on a weighing machine 38, after which pipe bundles are formed. The bundles ready for dispatch are lifted off from the weighing machine by means of a crane and fed to the dispatch region 4. The empty cassette is pushed by means of the transverse displacement mechanism onto the corresponding adjacent draw-in slideway 30 and fed once more to the store.

Arriving goods to be stored are unloaded by means of the shed crane 5 and fed to the receipt check. Then the cassettes are loaded and weighed. The filled cassettes pass onto the corresponding slideway 30 and are picked up by the storage machine. The storage machine moves simultaneously in the horizontal direction and with its lifting sledge also vertically, in which connection a predetermined storage compartment address is headed for. When the preselected position is reached and the state of the storage compartment, whether empty or occupied, is checked, then the cassette is run into the compartment and the displacement device brought once more into the initial position. The storage machine is now free, be it for a new storage or for a removal from store.

What I claim is:

1. An automatic high shelf storage apparatus especially adapted for storing heavy metal rods, pipes and sections to be moved by sliding in containers along longitudinal slideways in and between blocks of storage racks comprising:

individual compartments located with said blocks of storage racks having central parts which constitute a side by side pair of longitudinal slideways, an entrance and an exit for the slideway;

a cassette serving as the container for the heavy metal rods, pipes and sections which is constituted of a steel lattice body with end cross bars and two longitudinal smooth bottomed runners for sliding movements, said runners having upwardly bent ends which extend beyond the edge of a block to facilitate pulling or pushing of the loaded cassette as a sled from the cross bars at the end;

transfer mechanism to convey cassettes through the exit out one side of slideway of the pair and for loading a block with cassettes through another side of the slideway of the pair;

slide pieces fixed horizontally in the slideways of the compartments and in the racks which receive the cassette and also receive said transfer mechanism;

said slide pieces being impregnated with solid lubricant to provide a lubricated surface having controlled sliding properties so that static friction between a slide piece and the cassette is adequate to prevent unintentional shifting on the slideway during loading and unloading while facilitating pushing or pulling of the cassette;

a storage machine including a draw out device, lifting mechanism lifting table conveyor on tracks and entrainment means, said entrainment means adapted to extract a cassette from the rack for pushing the cassette into a slideway by hooking an end cross bar of the cassette from a direction below the cross bar under limited rotational movement of the lifting table and by being pushed by conveyor movement on the racks into the slideway;

pawls for effecting said hooking of the cassette by an end cross bar of the cassette said hooking being facilitated by the projection of the end of the cassette beyond the edge of the block whereby limited pivotal upward movement of the lifting table entrains the cross bar and permits vertical movement of the lifting table by the lifting mechanism;

a transverse thrust means for pushing the cassette sideways; and endless chain means adapted to handle two cassettes on side by side relation, said chain means being attached to said entrainment means.

2. Apparatus as claimed in claim 1 wherein said slide pieces comprise polyamide filled with molybdenum disulfide.

3. Apparatus as claimed in claim 1 wherein said entrainment means includes a U-shaped end piece to grasp the outer cross bar of the cassette.

* * * * *